United States Patent Office 3,129,252
Patented Apr. 14, 1964

1

3,129,252
PURIFICATION OF BUTYNEDIOL
David E. Graham and Eugene V. Hort, Westfield, N.J., assignors to General Aniline & Film Corporation, New York, N.Y., a corporation of Delaware
No Drawing. Filed Dec. 29, 1960, Ser. No. 79,171
10 Claims. (Cl. 260—637)

This invention relates to the purification of 2-butyne-1,4-diol, hereinafter referred to as butynediol, and more particularly to the purification of butynediol containing formaldehyde as an impurity.

Butynediol is well known and has been commonly manufactured by the reaction of acetylene with aqueous formaldehyde solution over a suitable catalyst. The effluent solution is concentrated and by-product propargyl alcohol distilled out. The butynediol produced in this manner always contains a relatively substantial amount of formaldehyde impurity ranging up to about 3% or more by weight of the butynediol. A typical product contains about 35% butynediol and 0.2 to 0.6% formaldehyde impurity. The presence of the formaldehyde is, for many purposes and uses, highly undesirable. In the catalytic hydrogenation of butynediol to butanediol or butenediol, the presence of formaldehyde in the butynediol results in a lower quality, stability and yield of hydrogenated product, a lower catalyst life, etc.

In the copending application of Eugene V. Hort, Serial No. 781,948, filed December 22, 1958, now U.S. Patent 2,993,078, dated July 18, 1961, there is disclosed and claimed a process for purifying butynediol containing formaldehyde as an impurity comprising adding thereto an amount of an alkyline substance such as an alkali metal hydroxide or alkaline earth metal hydroxide sufficient to reach an alkaline pH of more than 7 and maintaining the butynediol under such alkaline conditions until the desired reduction in formaldehyde content is obtained. Although this provides a simple, economical method for purification of butynediol, it has certain limitations. The use of too much alkali results in lowered yields while too little alkali may not remove a sufficient amount of formaldehyde. In addition, the process often requires an extended period of time for treatment with the alkali.

It is an object of this invention to provide a purifying process which will not be subject to the above disadvantages. It is another object of this invention to provide an improved process for removing, destroying or nullifying the effect of formaldehyde impurity in butynediol containing the same. A further object of this invention is the provision of an improved process for purifying butynediol containing formaldehyde impurity without damage or detriment to the butynediol. Still another object of this invention is to provide an improvement over the process disclosed and claimed in said copending application. Other objects and advantages will appear as the description proceeds.

The attainment of the above objects is made possible by the present invention which broadly comprises a process for purifying 2-butyne-1,4-diol in liquid form and containing up to about 3% formaldehyde impurity by weight of the 2-butyne-1,4-diol comprising treating such impure liquid 2-butyne-1,4-diol, in the presence of a Raney-type nickel catalyst carrying about 3 to 25% of copper by weight of said catalyst, with about 0.2 to 0.5 mole of an alkaline substance selected from the group consisting of alkali metal hydroxides and alkaline earth metal hydroxides per mole of formaldehyde impurity,

2 until the desired reduction in formaldehyde content is obtained.

The process of this invention has been found to substantially shorten the duration of treatment with alkali, to permit the use of less alkali, to give a longer-life catalyst in subsequent hydrogenation of the butynediol, and/or to improve the quality, stability and/or yield of hydrogenated product.

In carrying out the process of this invention, up to one-half mole of alkaline substance may be employed for each mole of formaldehyde impurity present in the butynediol, this being the theoretical amount of alkali required for the Cannizarro reaction to remove the formaldehyde. A larger amount of alkaline substance may be employed but tends to have a detrimental effect upon the butynediol. It is however one of the features of this invention that when carried out in the presence of the defined copper-carrying Raney-type nickel catalyst, a substantially smaller amount of alkaline substance down to about 0.2 mole per mole of formaldehyde may be employed without actually affecting the efficiency of the purification process.

As the alkaline substance employed in the present process, water soluble inorganic alkaline hydroxides such as sodium hydroxide, or potassium hydroxide are preferred. Any other alkali metal or alkaline earth metal hydroxide may be employed such as the hydroxides of lithium, magnesium, barium, and strontium and the like.

The temperature of treatment is preferably from about 80 to 110° C., although any temperature from room temperature to the boiling point of the mixture is effective. However, at decreasing temperatures below the preferred range, the rate of reduction in formaldehyde content of the butynediol diminishes, so that at room temperature the purification process may require many days. Temperatures above the preferred range may in some instances lead to side reactions.

The butynediol containing formaldehyde impurity is in liquid form, most advantageously in the form of a crude aqueous solution, usually in about 35% butynediol concentration as produced by the catalytic reaction of acetylene with aqueous formaldehyde solution. However, the present process is also applicable for the treatment of aqueous or organic solvent solutions of such impure butynediol in concentrations ranging from 15% or less up to 60% or more by weight. Thus, the butynediol containing formaldehyde as an impurity may be in the form of its solution in an organic solvent such as a monohydric alcohol, for example, ethyl, isopropyl, butyl or amyl alcohol, or a glycol such as ethylene glycol, propylene glycol, hexanediol, or preferably butanediol. The use of butanediol as a solvent is particularly advantageous when the purified butynediol produced by the process of this invention is to be subsequently completely hydrogenated to butanediol, since the butynediol solution produced hereby may be directly hydrogenated to produce a unitary product requiring no separation of solvent.

An essential feature of this invention is the use in the alkaline treatment of the butynediol of a Raney-type nickel catalyst carrying about 3 to 25% of copper by weight of the catalyst. Such a catalyst may be prepared by admixing an aqueous solution of a water soluble copper salt with the Raney-type nickel catalyst and then hydrogenating the mixture. It is preferred however to prepare the catalyst employed in the present process by mixing a water soluble copper salt with a water soluble inorganic alkaline hydroxide of the above-described type in an aqueous solution at a pH high enough to insolubilize the copper salt in the form of suspended copper oxide, admixing the resulting aqueous suspension of copper oxide with the Raney-type nickel catalyst, and then treating the resulting admixture with hydrogen to deposit metallic copper on the nickel catalyst. The latter catalyst is less pyrophoric and has increased catalytic activity and its production is disclosed and claimed in the copending application of Eugene V. Hort entitled "Modified Nickel Hydrogenation Catalyst," Serial No. 79,174, filed on even date herewith.

It is a feature of this invention that the above described copper treated Raney-type nickel catalyst need not be freshly prepared but instead may have been previously employed for hydrogenation (e.g., of butynediol) and hence no longer very active. This is obviously economically advantageous since the present alkaline treatment may be carried out with a spent catalyst. In preparing the catalysts of this invention, any water soluble copper salt may be employed, copper salts of strong and weak acids being generally operative, such as copper sulfate, chloride, nitrate, acetate, formate, carbonate, cyanide, and the like. Sufficient copper salt should be employed in preparing the catalyst to permit deposition on the particles of nickel catalyst of about 3 to 25% of copper in metallic form.

The purified butynediol produced by the process of this invention may be readily hydrogenated by the processes disposed and claimed in U.S. Patents 2,950,236 and 2,953,605 and in our copending application Serial No. 783,717, filed December 30, 1958, now U.S. Patent 2,967,893, dated January 10, 1961. When using a freshly prepared catalyst in the alkaline purifying treatment of this invention, the resulting mixture of purified butynediol and catalyst may be subjected to treatment with hydrogen to hydrogenate the butynediol to butenediol or butanediol directly and without addition of further catalyst. Since however the catalyst is to some extent poisoned during the present alkaline purifying treatment of impure butynediol, its activity and life in the subsequent hydrogenation is to that extent deleteriously affected. It is accordingly preferred for economic and other reasons to employ spent catalyst in the alkaline purifying treatment of this invention and to employ freshly prepared catalyst for the subsequent hydrogenation.

The following examples are only illustrative of this invention and are not to be regarded as limitative. All parts and proportions referred to herein and in the appended claims are by weight unless otherwise indicated.

*Example 1*

To a solution of approximately 35% crude aqueous butynediol containing 0.6% formadehyde was added 15 millimoles of NaOH per mole of butynediol present. The solution was heated for 1 hour at 95° C. to reduce the formaldehyde concentration. This is about one-third less than the amount of caustic soda theoretically required for the Cannizarro reaction to remove the formaldehyde in this particular crude butynediol as shown below.

To 1450 g. (6.0 moles) of the above purified butynediol solution was added 12 g. of copper acetate and the solution was adjusted to pH 8.5 with sodium hydroxide. To this slurry was added 48 g. of a 50% aqueous Raney nickel paste. The material was charged into a 1 gallon stirred autoclave and hydrogenated to completion at 40° C. and 75 p.s.i.g. (pounds per square inch gauge, hydrogen pressure). This required 5¼ hours. It was then held at 100° C. and 75 p.s.i.g. for 3 hours, cooled and discharged.

After this first run the catalyst was reused under the same conditions for a series of runs using the same purified butynediol. The butanediol was isolated from each run by filtration from the catalyst and vacuum distillation. The resultant butanediol was analyzed for purity by solidification point (S.P.) nad carbonyl No. (mg. KOH/g. of sample) which indicates the presence of undesirable carbonyl containing by-products. The results are tabulated below:

| Catalyst Use | Distilled Product | | |
|---|---|---|---|
| | Yield Percent of Theory | S.P., ° C. | Carbonyl Number |
| 1st | 88.0 | 19.4 | 1.3 |
| 2nd | 91.5 | 19.3 | 2.6 |
| 3rd | 89.1 | 18.3 | 20.2 |
| 4th | 86.0 | 18.0 | 30.3 |

As can be seen the purity and yield begin to fall off, showing markedly lowered catalyst activity with use, or a poor catalyst life. Pure butanediol has an S.P. of about 20.9° C.

*Example 2*

Another portion of the same solution of crude butynediol as in Example 1 was purified by addition of 22.5 millimoles of NaOH per mole of butynediol (approximately the theoretical amount of caustic soda for the Cannizarro reaction) and heating for 4 hours at 95° C. It was hydrogenated and the resultant product isolated and analyzed in a series of catalyst reuses as in Example 1, with the following results.

| Catalyst Use | Distilled Product | | |
|---|---|---|---|
| | Yield Percent of Theory | S.P., ° C. | Carbonyl Number |
| 1st | 87.4 | 19.2 | 2.0 |
| 2nd | 92.0 | 19.0 | 2.5 |
| 3rd | 92.0 | 18.7 | 3.3 |
| 4th | 91.5 | 19.0 | 2.5 |

Good catalyst life is thus obtained by using more caustic soda and longer time of treatment.

Prolonging this series beyond the 6th catalyst use gave a gradual fall-off in yield and increase in carbonyl No. so that by the 9th run the yield was 88% and the carbonyl No. was 8.

*Example 3*

More of the same solution of crude butynediol as in Example 1 was purified exactly as in Example 1 except that in addition to the 15 millimoles of NaOH per mole of butynediol (insufficient quantity) there was present 4 g. per mole of butynediol of the copper modified Raney nickel catalyst described in Example 1 of said copending application of Hort filed on even date herewith. This solution was used in a series of runs as described in Example 1 hereinabove with the following results:

| Catalyst Use | Distilled Product | | |
|---|---|---|---|
| | Yield Percent of Theory | S.P., ° C. | Carbonyl Number |
| 1st | 89.7 | 18.7 | 2.0 |
| 2nd | 90.1 | 18.7 | 4.0 |
| 3rd | 90.9 | 18.8 | 3.0 |
| 4th | 91.0 | 18.7 | 4.0 |
| 5th | 90.0 | 18.8 | 5.0 |
| 6th | 92.3 | 18.6 | 7.0 |
| 7th | 92.3 | 19.2 | 4.0 |
| 8th | 92.1 | 19.0 | 4.0 |
| 9th | 92.8 | 19.1 | 3.0 |

As can be seen the yields and quality were maintained at a good level for a long series of runs without apparent catalyst failure.

*Example 4*

This was run exactly as in Example 3 except that 23 millimoles of caustic soda per mole of butynediol was used, the catalyst used in the butynediol treatment had previously been used for hydrogenation and was no longer very active, and the treatment time was only one-half hour. The results were as follows:

| Catalyst Use | Distilled Product | | |
|---|---|---|---|
| | Yield Percent of Theory | S.P., °C. | Carbonyl Number |
| 1st | 88.0 | 19.2 | 0.4 |
| 2nd | 90.2 | 19.0 | 1.3 |
| 3rd | 89.7 | 19.0 | 3.0 |
| 4th | 93.0 | 18.9 | 3.0 |
| 5th | 90.5 | 19.1 | 2.4 |
| 10th | 91.9 | 19.0 | 2.9 |
| 15th | 89.5 | 19.1 | 2.8 |
| 20th | 92.3 | 19.1 | 2.1 |
| 22nd | 91.0 | 18.9 | 4.0 |

The run was continued for a total of 39 catalyst uses. It was discontinued while the catalyst was still active.

*Example 5*

This was run exactly the same as Example 3 except that instead of the copper modified Raney nickel catalyst, unmodified Raney nickel catalyst was used in the butynediol treatment. The results were as follows:

| Catalyst Use | Distilled Product | | |
|---|---|---|---|
| | Yield Percent of Theory | S.P., °C. | Carbonyl Number |
| 1st | 91.4 | 19.0 | 2.7 |
| 2nd | 89.0 | 18.7 | 9.6 |
| 3rd | 88.6 | 18.1 | 23.2 |
| 4th | 84.2 | 17.6 | 30.3 |

As can be seen this treatment with unmodified Raney nickel catalyst alone was ineffective.

*Example 6*

This was run the same as Example 3 except that a finely divided copper powder was used in place of the copper modified Raney nickel catalyst. The results were similar to Example 5.

This invention has been disclosed with respect to certain preferred embodiments, and there will become obvious to persons skilled in the art various modifications and variations thereof which are intended to be included within the spirit and scope of this invention.

We claim:

1. A process for purifying a solution of 2-butyne-1,4-diol in a solvent therefor selected from the group consisting of water and monohydric and dihydric unsubstituted aliphatic alcohols of up to 6 carbon atoms and containing up to about 3% formaldehyde impurity by weight of the 2-butyne-1,4-diol comprising treating such impure solution, in the presence of a Raney-type nickel catalyst carrying about 3 to 25% of copper by weight of said catalyst, with about 0.2 to 0.5 mole of an alkaline substance selected from the group consisting of alkali metal hydroxides and alkaline earth metal hydroxides per mole of formaldehyde impurity, until the desired reduction in formaldehyde content is obtained.

2. A process as defined in claim 1 wherein said solution of 2-butyne-1,4-diol is an aqueous solution.

3. A process as defined in claim 2 wherein said aqueous solution contains about 35% of 2-butyne-1,4-diol and 0.2 to 0.6% of formaldehyde.

4. A process as defined in claim 1 wherein said alkaline substance is an alkali metal hydroxide.

5. A process as defined in claim 1 carried out at a temperature of about 80 to 110° C.

6. A process for purifying an aqueous solution of 2-butyne-1,4-diol containing up to about 3% formaldehyde impurity by weight of the 2-butyne-1,4-diol comprising treating said solution in the presence of a Raney-type nickel catalyst carrying about 3 to 25% of copper by weight of said catalyst, with about 0.2 to 0.5 mole of sodium hydroxide per mole of formaldehyde impurity until the desired reduction in formaldehyde content is obtained.

7. A process as defined in claim 6 wherein said solution contains about 35% of 2-butyne-1,4-diol and 0.2 to 0.6% of formaldehyde.

8. A process for purifying a solution of 2-butyne-1,4-diol in a solvent therefor selected from the group consisting of water and monohydric and dihydric unsubstituted aliphatic alcohols of up to 6 carbon atoms and containing up to about 3% formaldehyde impurity by weight of the 2-butyne-1,4-diol comprising adding thereto a Raney-type nickel catalyst carrying about 3 to 25% by copper by weight of said catalyst, and about 0.2 to 0.5 mole of an alkaline substance selected from the group consisting of alkali metal hydroxides and alkaline earth metal hydroxides per mole of formaldehyde, and maintaining the resulting mixture at an elevated temperature of about 80 to 110° C. until the desired reduction in formaldehyde content is obtained.

9. A process as defined in claim 8 employed for purifying an aqueous solution containing about 35% of 2-butyne-1,4-diol and 0.2 to 0.6% of formaldehyde.

10. A process as defined in claim 9 wherein said alkaline substance is sodium hydroxide.

References Cited in the file of this patent

UNITED STATES PATENTS 2,950,326    Hort                 Aug. 23, 1960